Patented May 3, 1938

2,115,884

UNITED STATES PATENT OFFICE 2,115,884

PROCESS FOR THE ALKYLATION OF COMPOUNDS AND THE ISOMERIZATION AND CONVERSION OF ALKYL-COMPOUNDS

Karl Schöllkopf, Dusseldorf-Oberkassel, Germany, assignor to the firm Rheinische Kampfer-Fabrik G. m. b. H., Dusseldorf-Oberkassel, Germany No Drawing. Application August 22, 1929, Serial No. 387,819. In Germany September 17, 1928

6 Claims. (Cl. 260—168)

The present invention relates to a process for the catalytic alkylation of organic compounds and consists in attaching olefinic hydrocarbons to the compounds to be alkylated with the aid of certain catalysts under the influence of heat. This process of alkylation is to be understood to include the introduction of alkyl, cycloalkyl and aralkyl groups into the organic compounds.

The use of catalysts or contact substances and condensation agents for the above-mentioned alkylating reaction is, it is true, already known. Thus, metal salts, particularly aluminium chloride, mineral acids, such as sulphuric acid, and metal oxides, such as aluminium oxide and thorium oxide, have hitherto been used as catalysts of this kind.

It has now been found that in place of the catalysts mentioned above, bleaching earths, activated by treatment with acids, as well as clays, kaolins and similar silicates, activated in like manner, may also be employed with particular advantage for effecting alkylation. These surface catalysts in the main consist of hydro-silicates of aluminium, magnesium and iron and free hydrated silicic acid and are referred to in the following as "activated hydro-silicates".

By further treating these activated hydrosilicates with acids, such as hydrochloric acid or sulphuric acid, the basic constituents, such as aluminium oxide, magnesium oxide and iron oxide are almost completely dissolved out. The resulting hydrated silicic acids are also well adapted as catalysts for effecting alkylation. The use of activated hydro-silicates and hydrated silicic acids obtained therefrom by decomposition with acids as alkylation catalysts was hitherto not known. Besides their low cost these contact substances possess various other advantages over the catalysts hitherto employed. Thus, the catalytic activity of the above-mentioned new contact substances is considerably greater than that of aluminium oxide.

The attachment of the olefinic hydrocarbons, for example ethylene, propylene, cyclohexene, styrol C₆H₅.CH=CH₂ and the like, to cyclic hydrocarbon compounds, which include, besides the hydrocarbons proper, such as benzene or naphthalene, also their substitution products, such as halogen-, nitro- and other derivatives, is readily effected with the aid of the aforesaid new contact substances with the formation of products alkylated at one or more nuclear carbon atoms.

The aforesaid new contact substances further effect the attachment of olefines to carboxylic acids, that is, carboxylic derivatives of cyclic hydrocarbons, with the formation of esters. For example by attachment of propylene to benzoic acid with the aid of said contact substances the isopropyl ester of benzoic acid is obtained.

It is also possible to effect alkylation at the nitrogen atom as well as alkylation at the carbon and oxygen atoms with the aid of the activated hydro-silicates and the hydrated silicic acids obtained therefrom. Thus, with the aid of these contact substances olefinic hydrocarbons may be attached to aromatic amines with the formation of alkylated amines, that is, amino derivatives of cyclic hydrocarbons. For example by attaching olefinic hydrocarbons to aromatic amines, for example aniline or naphthylamine, the corresponding products alkylated at the nitrogen atom may be obtained.

The following examples serve to show how the catalytic alkylation by attaching olefinic hydrocarbons to the compounds to be alkylated may be effected by means of activated hydro-silicates and hydrated silicic acids obtained therefrom, it being understood, however, that the methods of application of these new contact substances are not limited to the described mode of action.

1. Naphthalene together with 20% of one of the commercial activated bleaching earths, for example "Tonsil", (a registered trade-mark) is treated with stirring in an autoclave at about 230° C. with ethylene under a pressure of about 20–40 atmospheres. After an equimolecular quantity of ethylene has become attached to the naphthalene in the course of several hours, the reaction product is separated from the catalyst by filtering or centrifuging and subjected to fractional distillation. The first runnings consist of unchanged naphthalene followed by the main fraction consisting of a liquid mixture of isomeric mono-ethyl naphthalenes having a boiling point of about 250–260° C., whilst the second runnings consist of high boiling poly-ethyl naphthalenes. If the process is carried out for a longer time under the above-mentioned experimental conditions with twice the quantity or even more of ethylene, poly-ethyl naphthalenes are predominantly obtained. In place of ethylene, cracking gases containing ethylene and other olefines may also be employed and, in place of naphthalene, products having a high naphthalene content. The resulting alkylation products are highly valuable oils.

2. Benzoic acid is treated at about 230° C. in an autoclave with stirring together with 20% of "Tonsil" with propylene under a pressure of about 50–60 atmospheres. After an equimolecular quantity of propylene has been absorbed in the course of several hours, the reaction mixture is made alkaline and distilled with steam. A good yield of the isopropyl ester of benzoic acid of boiling point 218° C. is obtained.

3. 4 - chloro-meta-cresol (6 - chloro- 3 -oxy-1-methyl-benzene) is heated in an autoclave with 20% of "Tonsil" to 140° C.–160° C. and propylene forced in under a pressure of 5–20 atmospheres until an equimolecular quantity of propylene has become absorbed. The isopropyl ether of 4-chloro-meta-cresol is first formed and from this, by isomerization, 4-chloro-thymol (6-chloro-3-oxy-1-methyl-4-isopropyl benzene) of melting point 62° C.–64° C. and boiling point 258° C.–259° C.

In place of the activated bleaching earths employed in Examples 1–3, kaolins, which have been partially decomposed by heating to 100° C.–120° C. for several hours with 25% sulphuric acid, may also be employed. Further the bleaching earths or kaolins and similar silicates may be converted by a fairly long treatment with strong hydrochloric acid or sulphuric acid at about 100–120° C. into the corresponding hydrated silicic acids and the latter employed as contacts after washing out the mineral acids and drying on the water bath.

What I claim is:—

1. In the alkylation of organic compounds, the process which comprises reacting together at elevated temperatures an olefinic hydrocarbon and an aromatic hydrocarbon selected from the group consisting of benzene and naphthalene, in the presence of an activated hydro-silicate catalyst.

2. In the alkylation of organic compounds, the process which comprises reacting together at elevated temperatures an olefinic hydrocarbon and benzene in the presence of an activated hydro-silicate catalyst.

3. In the alkylation of organic compounds, the process which comprises reacting together at elevated temperatures an olefinic hydrocarbon and naphthalene in the presence of an activated hydro-silicate catalyst.

4. In the alkylation of organic compounds, the process which comprises reacting together at elevated temperatures an olefinic hydrocarbon and a non-phenolic aromatic compound, free from phenolic hydroxyl groups, in the presence of an activated hydro-silicate catalyst and distilling the reaction product to recover two fractions, one containing mono-alkylated compounds and the other containing poly-alkylated compounds.

5. In the alkylation of organic compounds, the process which comprises reacting together at elevated temperatures an olefinic hydrocarbon and a non-phenolic aromatic compound, in the presence of a surface catalyst, distilling the reaction product to recover two fractions, one containing mono-alkylated compounds and the other containing poly-alkylated compounds, and reacting the fraction containing said poly-alkylated compounds with an additional cyclic hydrocarbon compound in the presence of said catalyst, thereby equilibrating the mixture.

6. In the alkylation of organic compounds, the process which comprises reacting together at elevated temperatures an olefinic hydrocarbon and naphthalene in the presence of a surface catalyst, and distilling the reaction product to recover two fractions, one containing mono-alkylated compounds and the other containing poly-alkylated compounds.

KARL SCHÖLLKOPF.